US007019915B2

(12) United States Patent
Sakamoto

(10) Patent No.: US 7,019,915 B2

(45) Date of Patent: Mar. 28, 2006

(54) LENS BARRELS

(75) Inventor: Takamasa Sakamoto, Osaka (JP)

(73) Assignees: Asia Optical Co., Inc., Taichung (TW); Optek Corporation, Osaka (JP)

( * ) Notice: Subject to any disclaimer, the term of this patent is extended or adjusted under 35 U.S.C. 154(b) by 0 days.

(21) Appl. No.: 11/002,709

(22) Filed: Dec. 2, 2004

(65) Prior Publication Data

US 2005/0254140 A1 Nov. 17, 2005

(30) Foreign Application Priority Data

May 14, 2004 (JP) ............................ 2004-144647

(51) Int. Cl.
*G02B 15/14* (2006.01)
*G03B 17/00* (2006.01)

(52) U.S. Cl. ...................... 359/695; 359/694; 359/699; 359/701; 396/72; 396/73; 396/349

(58) Field of Classification Search ................ 359/694, 359/695, 699, 700, 701, 822; 396/72, 73, 396/349, 350
See application file for complete search history.

(56) References Cited

U.S. PATENT DOCUMENTS

| | | | | |
|---|---|---|---|---|
| 6,952,526 | B1 * | 10/2005 | Nomura | 396/73 |
| 6,959,148 | B1 * | 10/2005 | Nomura | 396/73 |
| 6,978,088 | B1 * | 12/2005 | Nomura | 396/73 |
| 2004/0042096 | A1 * | 3/2004 | Momura | 359/822 |
| 2004/0042775 | A1 * | 3/2004 | Momura | 396/73 |
| 2004/0051967 | A1 * | 3/2004 | Nomura | 359/701 |
| 2004/0091253 | A1 * | 5/2004 | Nomura | 396/72 |
| 2004/0141736 | A1 * | 7/2004 | Nomura | 396/72 |

FOREIGN PATENT DOCUMENTS

| | | |
|---|---|---|
| JP | 2003-315861 | 11/2003 |
| JP | 2004-085934 | 3/2004 |

* cited by examiner

*Primary Examiner*—Loha Ben
(74) *Attorney, Agent, or Firm*—Thomas, Kayden, Horstemeyer & Risley

(57) ABSTRACT

A lens barrel is retractable in electronic equipment having an image-generating device, such as a CCD. During photographing, the lens barrel relocates a first lens group and a second lens group to a predetermined position in an optical axis to zoom the image of an object. During collapsing, the first lens group and the second lens group adjacent to the object side are transferred to a side of a CCD which is away from the optical axis and a focus driving mechanism drives the third lens group along the optical axis. The focus driving mechanism is disposed inside the lens barrel.

16 Claims, 21 Drawing Sheets

LENS BARRELS

BACKGROUND

The invention relates to lens barrels, and in particular, to lens barrels which is collapsible in digital cameras.

As demand for smaller digital cameras increase, thinner cameras are also emphasized for portability. Thus, thinner lens barrels are required. In a conventional thinner lens barrel, a gap between a lens group and an image-generating device is reduced when not in use, allowing a shorter lens barrel.

In Japan Pub. No. 2003-315861, during receiving, part of photographic lens groups is transferred from an optical axis to provide a thinner lens barrel. In Japan Pub. No. 2004-85934, a thinner cam barrel for extending lens is provided without reducing movement of lens groups.

A conventional focus driving mechanism for driving a focus lens of a digital camera comprises a focus motor parallel to the optical axis, and a screw shaft mechanism mounted at the focus motor. Since the focus driving mechanism occupies the entire length of the focus motor plus that of the screw shaft mechanism along the optical axis, it is difficult to mount the focus driving mechanism inside the thinner lens barrel as disclosed in Japan Pub. No. 2003-315861. In Japan Pub. No 2004-85934, alternatively, the focus driving mechanism is disposed outside the lens barrel; however, this requires an increase in lens barrel size.

SUMMARY

A lens barrel is provided. An exemplary embodiment of a lens barrel comprises an image-generating device, a focus lens group, a focus motor, and a photographic optical system. The image-generating device generates a signal of an image of an object to be photographed. The focus lens group is disposed on a side of the image-generating device. The focus motor is disposed inside the lens barrel to drive the focus lens group. The photographic optical system comprises a plurality of lens groups. A number of the lens groups are transferred to the side of the image-generating device from an optical axis upon collapsing of the lens barrel.

The photographic optical system comprises a first lens group, a second lens group, and a third lens group consecutively. The third lens group is the focus lens group and is farthest from the object among the first, second, and third lens groups. The first and second lens groups are transferred to the side of the image-generating device from the optical axis.

Furthermore, the lens barrel comprises a lens driving mechanism to drive the focus lens group along the optical axis. Part of the lens driving mechanism is disposed on the side of the focus motor. The lens driving mechanism comprises a screw shaft.

DESCRIPTION OF THE DRAWINGS

The invention can be more fully understood by reading the subsequent detailed description and examples with references made to the accompanying drawings, wherein.

DETAILED DESCRIPTION

FIGS. 1–21 show an embodiment of a lens barrel 2, applied here in a digital camera with zoom function.

Figure 1:
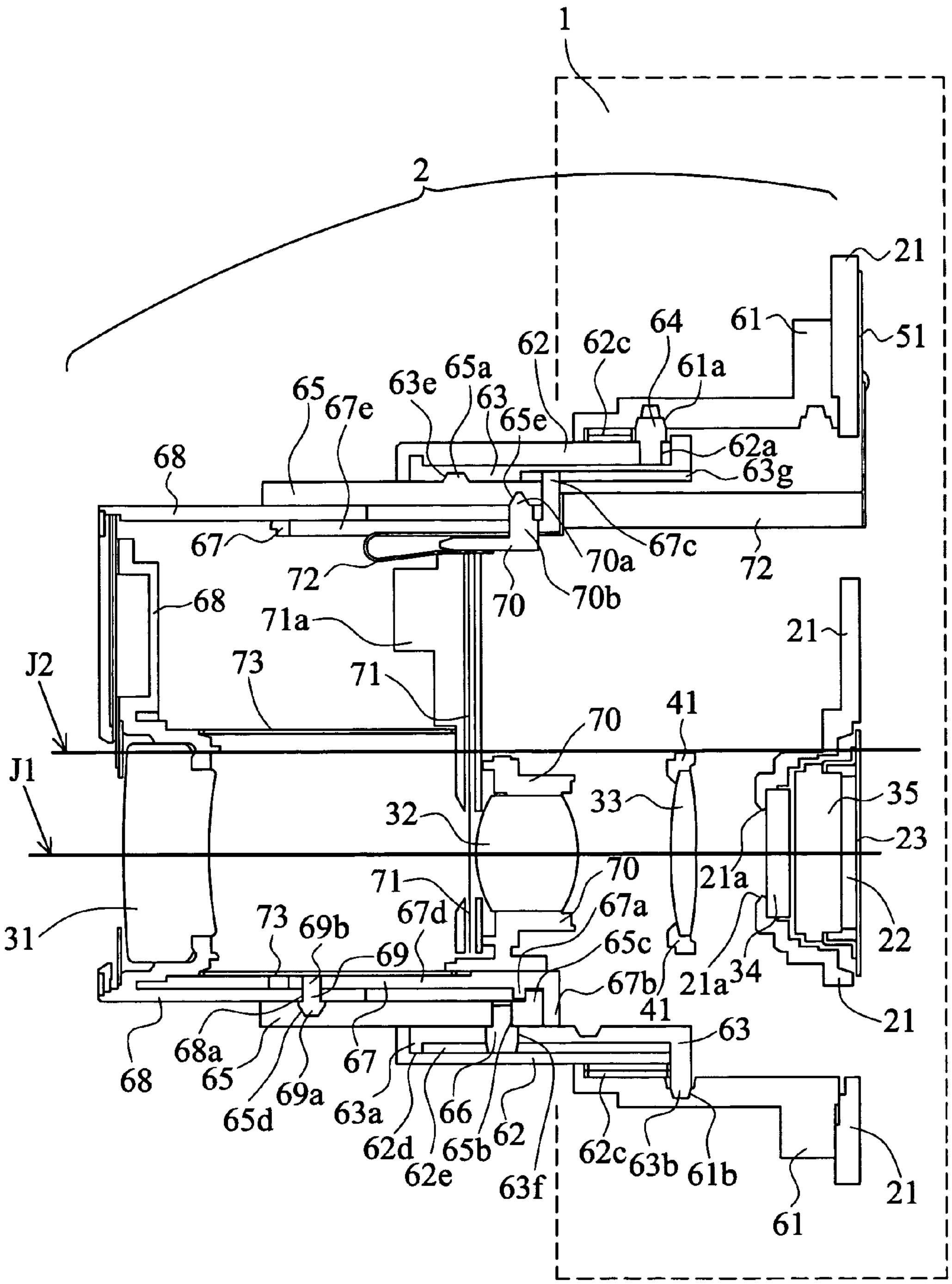
FIG. 1 is a cross section of an embodiment of a lens barrel in a photographing position in minimum zoom state.

FIG. 1 is a cross section of the lens barrel 2 in a photographing position in a minimum zoom state. A photographic optical system comprises a first lens group 31, a second lens group 32, a third lens group 33, a low pass filter 34, and a charge coupled device (CCD) 35 arranged consecutively from a side near an object to be photographed. The CCD 35 is used as an image-generating device. J1 represents an optical axis of the photographic optical system. The optical axis J1 is parallel to a central axis J2 of the lens barrel 2, and is eccentric from the central axis J2. Zoom operation is accomplished by moving the first and second lens groups 31 and 32 along the optical axis J1. Focus operation is accomplished by moving the third lens group 33 along the optical axis J1. A light from the side near the object reaches the CCD 35 via the first lens group 31, the second lens group 32, the third lens group 33, and the low pass filter 34 consecutively. In the following description, an optical axis direction means a direction that is parallel to the optical axis J1.

Note that the first and second lens 31 and 32 groups consist of a front lens group, and the third lens group 33 consists of a rear lens group. That is, the first lens group 31 is a first subgroup of the front lens group, and the second lens group 32 is a second subgroup of the front lens group.

A fixed barrel 61 is fixed to the body 1. A CCD holder 21 is fixed to the fixed barrel 61 to cover an opening of the fixed barrel 61. The low pass filter 34 is disposed in front of the CCD 35, and supported at an opening portion 21*a* of the CCD holder 21. The CCD 35 is supported along with a heat-dissipation plate 22, and fixed to the CCD holder 21 via the heat-dissipation plate 22. A flexible printed circuit board 23 for the CCD 35 is located behind the heat-dissipation plate 22 to transmit an electronic signal from the CCD 35.

Figure 2:
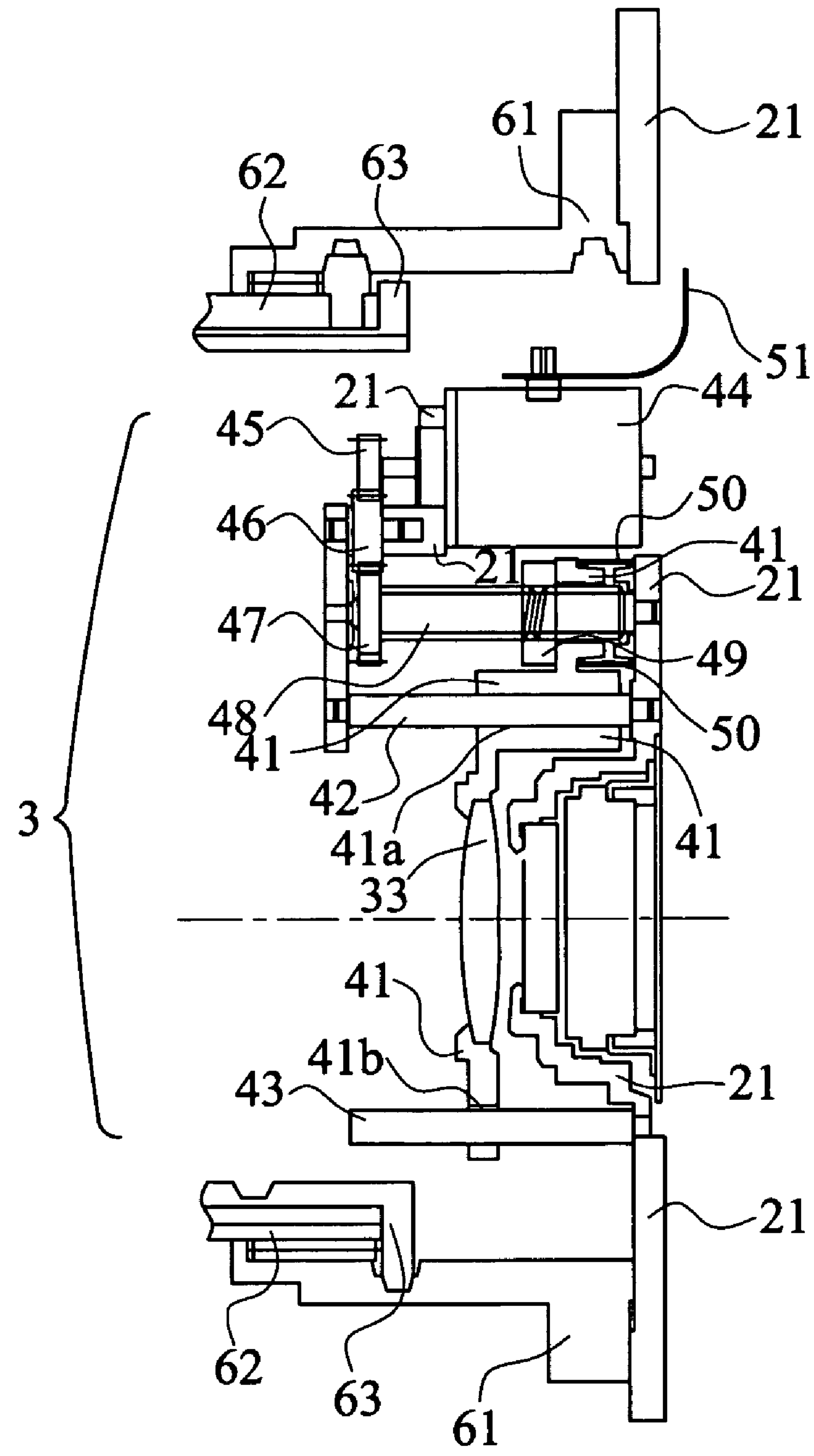
FIG. 2 is a cross section of a focus driving mechanism of the lens barrel in FIG. 1.

The third lens group 33 and a focus driving mechanism 3 for driving the third lens group 33 are assembled with respect to the CCD holder 21. FIG. 2 is cross section of the focus driving mechanism 3. A third lens frame 41 for supporting the third lens group 33 is slidably supported in the optical axis direction via a pair of guide shafts 42 and 43 disposed on the CCD holder 21. The guide shaft 42 is the main guide shaft of the third lens frame 41. The guide shaft 43 limits the rotation of the third lens frame 41, and is slidably inserted into guide holes 41*a* and 41*b* on the third lens frame 41.

A focus motor 44 is disposed on the side of the CCD 35 and the third lens group 33. Also, the focus motor 44 is located inside the fixed barrel 61, and fixed with respect to the CCD holder 21. The rotational driving force of the focus motor 44 is transmitted to a screw shaft 48 via a focus motor gear 45, focus gears 46 and 47. By means of the screwing relationship between the screw shaft 48 and a nut 49, the third lens frame 41 moves forward/backward along the optical axis direction. Since the rotational driving force of the focus motor 44 is decelerated by the focus gears 46 and 47, the screw shaft 48 receives sufficient rotary torque. The third lens frame 41 is biased along the optical axis direction by a spring 50. The focus motor 44 is controlled by a control circuit of the camera via a flexible printed circuit board 51 located behind the CCD holder 21.

Figure 3:
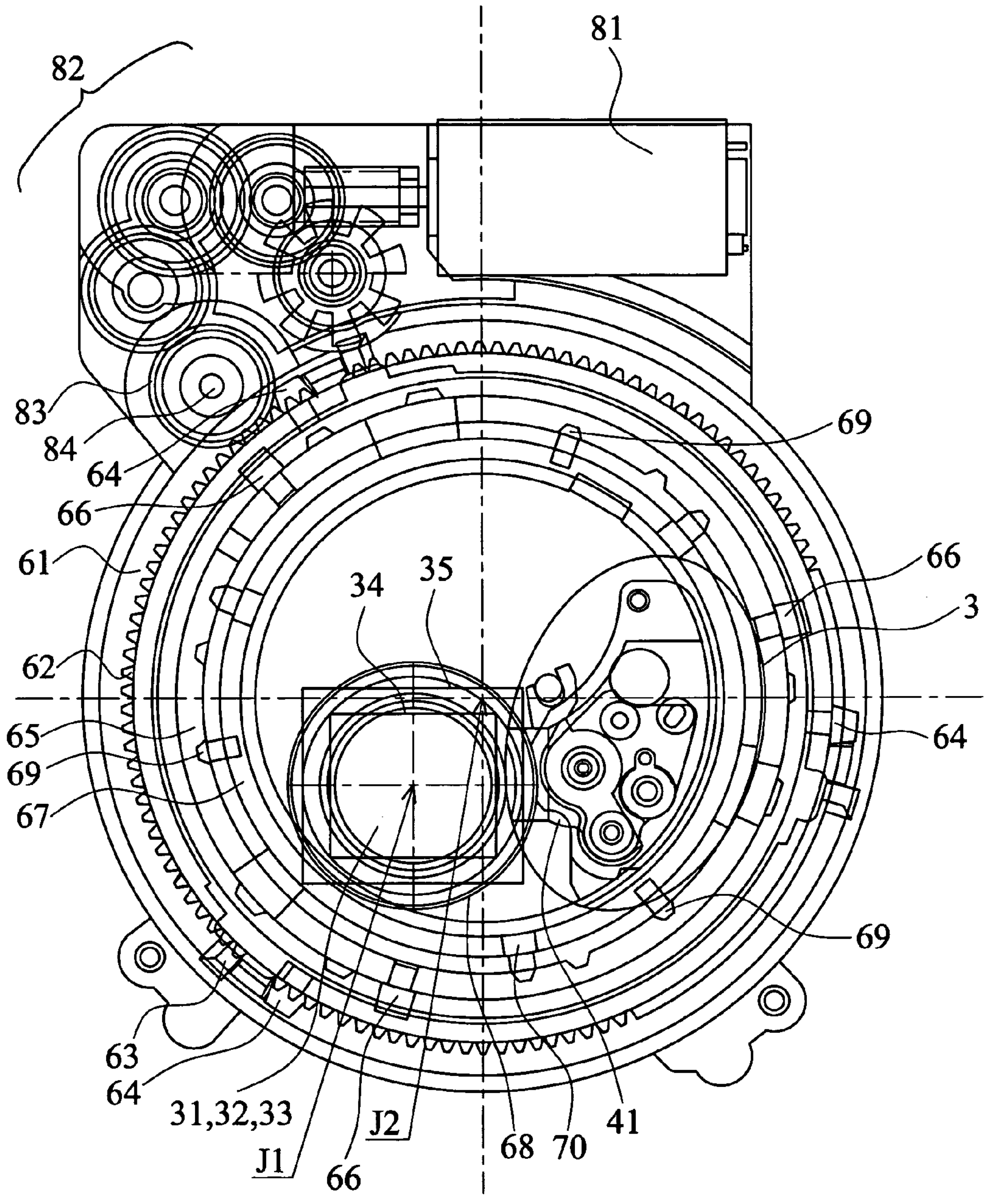
FIG. 3 is a front perspective view of the lens barrel in the photographing position.

FIG. 3 is a front perspective view of the lens barrel 2 in the photographing position. A zoom motor 81 and a deceleration gear train 82 are located above the fixed barrel 61. The driving force of the zoom motor 81 is transmitted to a zoom gear 83 via the deceleration gear train 82. The zoom gear 83 is supported by a gear shaft 84 parallel to the optical axis direction, and rotates with respect to the fixed barrel 61. The zoom motor 81, the deceleration gear 82, and the zoom gear 83 drive the expansion mechanism of the lens barrel 2. The zoom motor 81 is controlled by the control circuit of the camera via the flexible printed circuit board 51 located behind the CCD holder 21.

Figure 4:
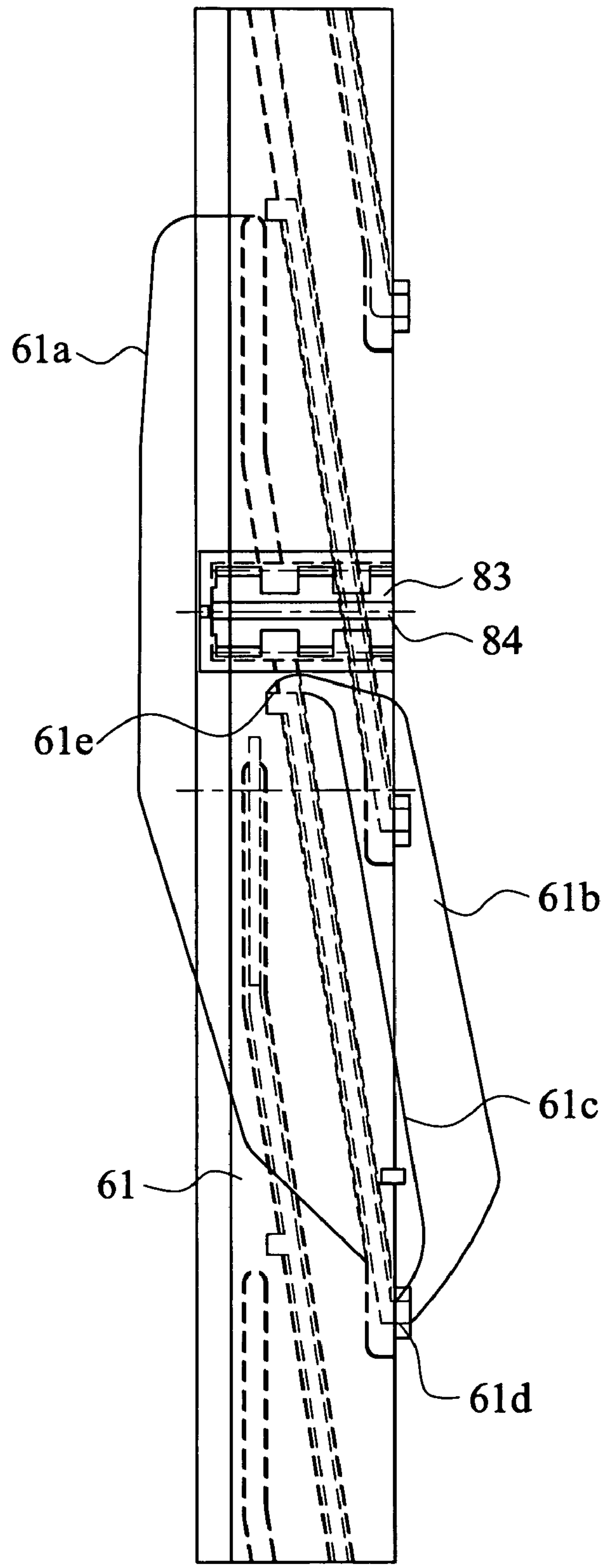
FIG. 4 is a schematic view of a fixed barrel from the outer periphery thereof.
Figure 5:
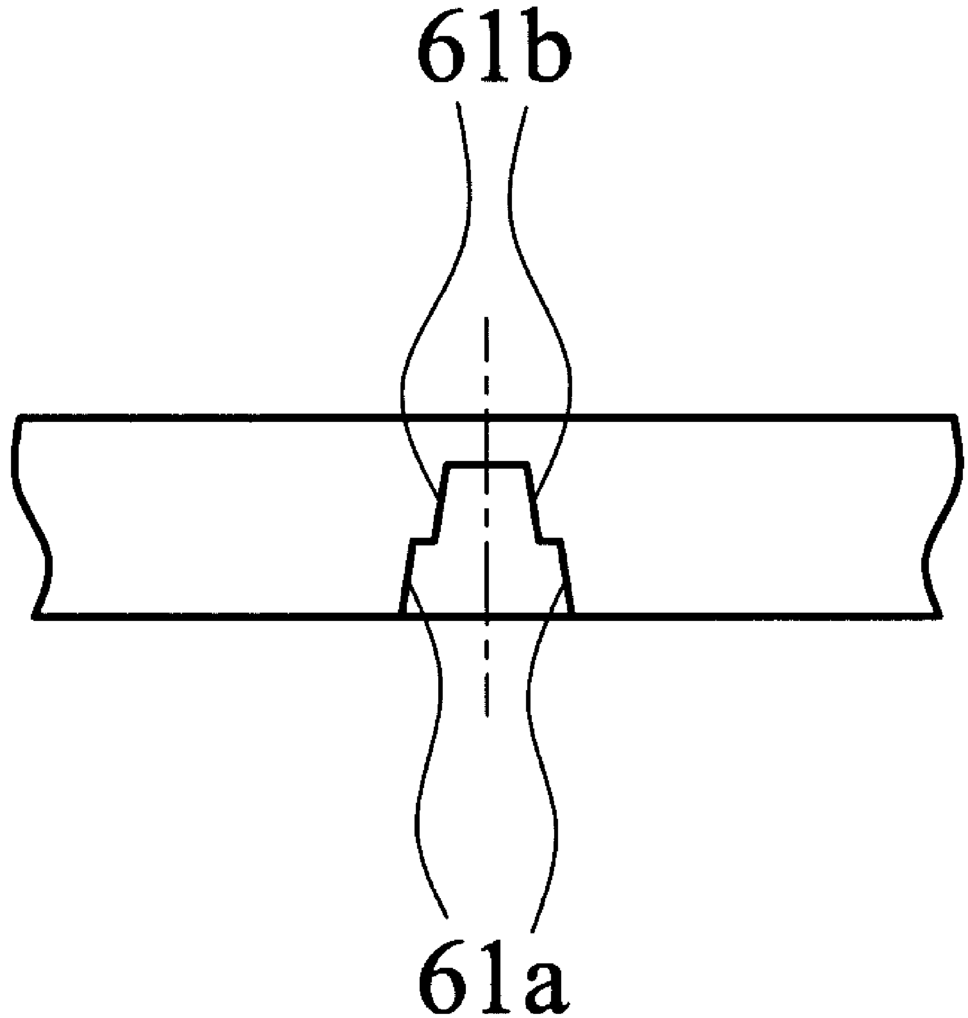
FIG. 5 is a cross section of a cam groove of the fixed barrel.

FIG. 4 is a schematic view of the fixed barrel 61 from the outer periphery thereof. Three cam grooves 61*a*, for guiding a rotary barrel 62, and three cam grooves 61*b*, for guiding a restraining barrel 63, are formed at the inner periphery of the fixed barrel 61. The cam grooves 61*a* are deeper than the cam grooves 61*b*. The cam grooves 61*a* and 61*b* comprise the same area 61*c* with same cam trajectory. A cam groove shaped as shown in FIG. 5 is formed in area 61*c*.

Figure 6:
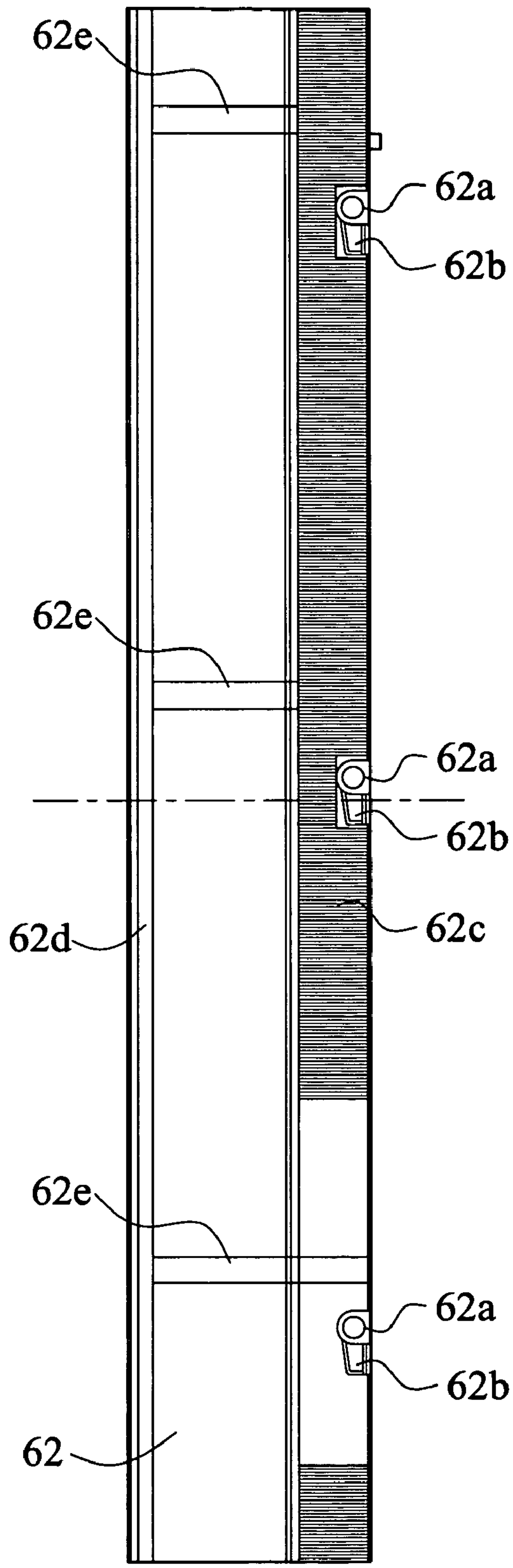
FIG. 6 is a schematic view of a rotary barrel from the outer periphery thereof.

FIG. 6 is a schematic view of the rotary barrel 62 from the outer periphery thereof. The rotary barrel 62 is located inside the fixed barrel 61, and comprises holes 62*a*. Three follower pins 64 are inserted into the holes 62*a*, engaging with the cam grooves 61*a* of the fixed barrel 61. Protrusions 62*b* are formed at the outer periphery of the rotary barrel 62 around the inserted follower pins 64, and shaped to be substantially engaged with the cam grooves 61*a* of the fixed barrel 61. A gear portion 62*c* is disposed at the outer periphery of the rotary barrel 62 to mesh with the zoom gear 83. The rotational driving force is transmitted by the driving mechanism, comprising the zoom motor 81, the deceleration gear 82, and the zoom gear 83. By the rotation of the zoom gear 83, the rotary barrel 62 is rotated around the central axis J2, such that the rotary barrel 62 is driven forward/backward along the cam grooves 61*a* of the fixed barrel 61.

Figure 7:
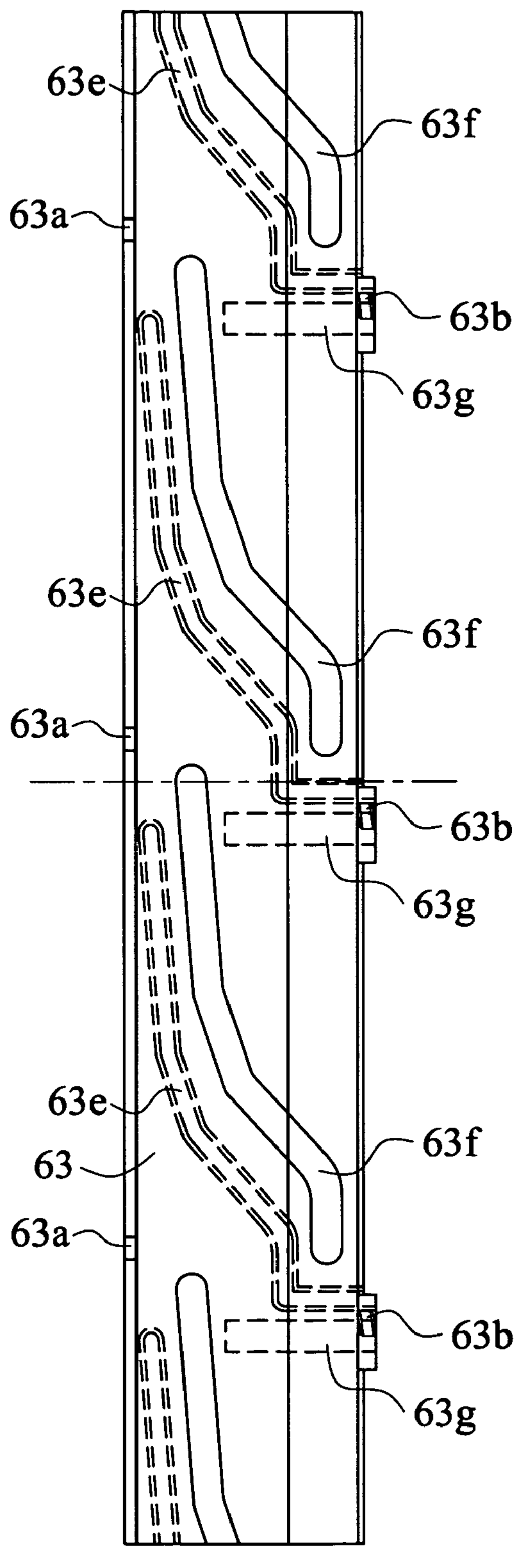
FIG. 7 is a schematic view of a restraining barrel from the outer periphery thereof.
Figure 8:
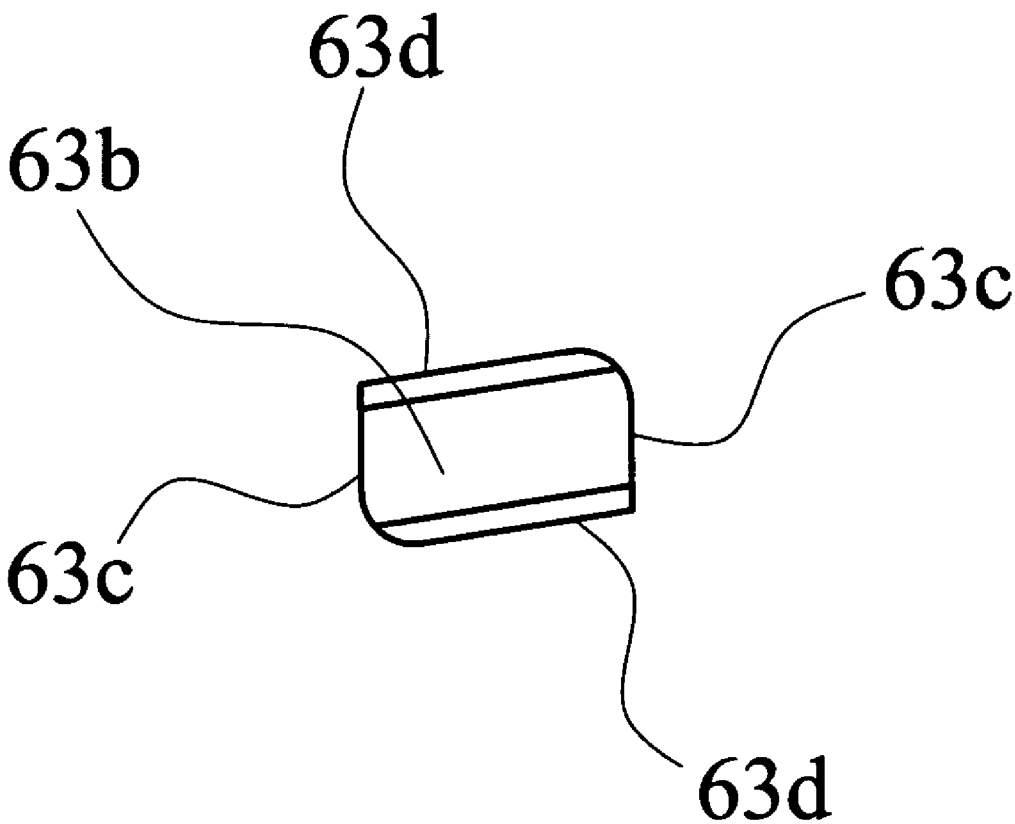
FIG. 8 is a cross section of a cam follower of the restraining barrel.

FIG. 7 is a schematic view of the restraining barrel 63 from the outer periphery thereof. The restraining barrel 63 is located inside the rotary barrel 62. Claws 63*a*, disposed at the outer periphery of the restraining barrel 63, engage with grooves 62*d* formed at the inner periphery of the rotary barrel 62. The restraining barrel 63 is rotatably supported, and limited to move to the optical axis direction with respect to the rotary barrel 62. Three cam followers 63*b* are formed at the outer periphery of the restraining barrel 63 to engage with the cam grooves 61*b* of the fixed barrel 61. The cam follower 63*b* of the restraining barrel 63 has a parrallelogram cross section as shown in FIG. 8. Each cam follower 63*b* comprises a flat surface 63*c*, engaging with straight areas 61*d* and 61*e* of the cam groove 61*b* of the fixed barrel 61, and a flat surface 63*d* engaging with inclined areas 61*c* of the cam groove 61*b* of the fixed barrel 61.

Figure 9:
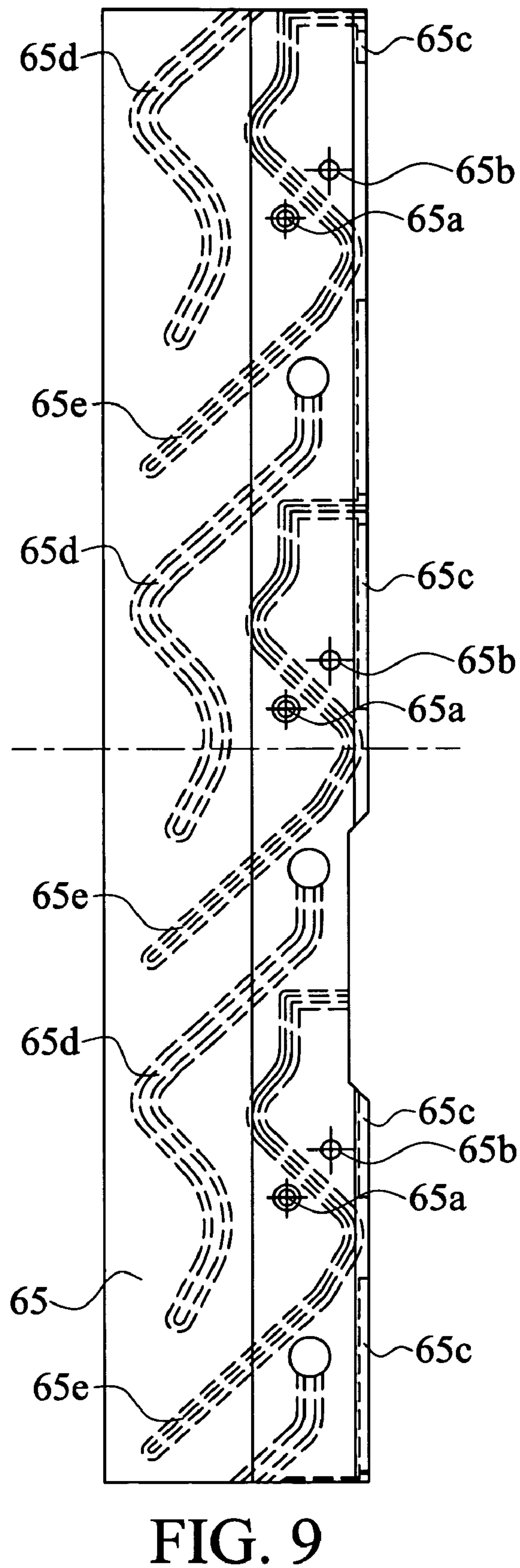
FIG. 9 is a schematic view of a cam barrel from the outer periphery thereof.

FIG. 9 is a schematic view of a cam barrel 65 from the outer periphery thereof. The cam barrel 65 is located inside the restraining barrel 63, and comprises three cam followers 65*a* at the outer periphery. The cam followers 65*a* engage with the cam grooves 63*e* disposed at the inner periphery of the restraining barrel 63. By means of the rotation of the cam barrel 65 with respect to the restraining barrel 63, the cam barrel 65 is driven forward/backward via the cam grooves 63*e* of the restraining barrel 63. Three guiding shafts 66 are inserted into holes 65*b* of the cam barrel 65 through the holes 63*f* of the restraining barrel 63 to engage with forward grooves 62*e* disposed at the inner periphery of the rotary barrel 62 along the optical axis direction. Thus, the cam barrel 65 cannot rotate with respect to the rotary barrel 62, but can move with respect to the rotary barrel 62 along the optical axis direction. That is, the restraining barrel 63 can rotate with respect to the rotary barrel 62. The cam barrel 65 is driven forward/backward along the cam grooves 63*e* of the restraining barrel 63.

Figure 10:
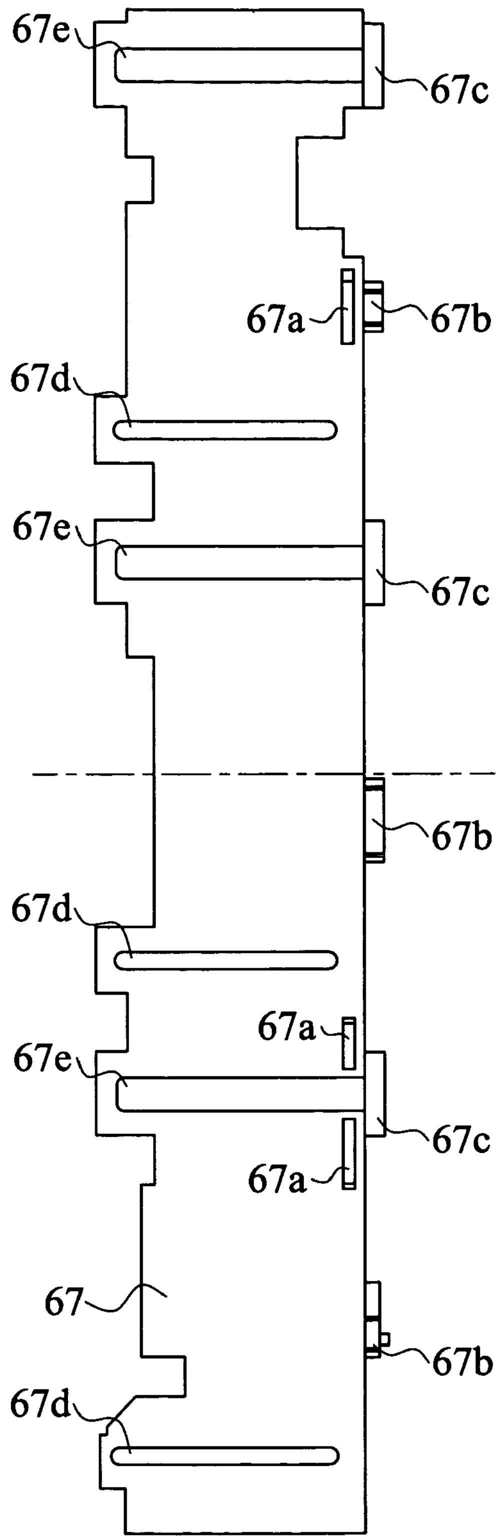
FIG. 10 is a schematic view of a forward barrel from the outer periphery thereof.

FIG. 10 is a schematic view of a forward barrel 67 from the outer periphery thereof. The forward barrel 67 is located inside the cam barrel 65. The movement of claws 65*c*, disposed at the inner periphery of the cam barrel 65, to the optical axis direction is limited by clipping the claws 65*c* between protrusions 67*a* and 67*b* disposed at the outer periphery of the forward barrel 67. The forward barrel 67 is supported to be rotatable with respect to the cam barrel 65. Guide claws 67*c*, disposed at the outer periphery of the forward barrel 67, engage with forward grooves 63*g* disposed at the inner periphery of the restraining barrel 63 along the optical axis direction. Thus, the forward barrel 67 cannot rotate with respect to the restraining barrel 63, but can move with respect to the restraining barrel 63 along the optical axis direction.

Figure 11:
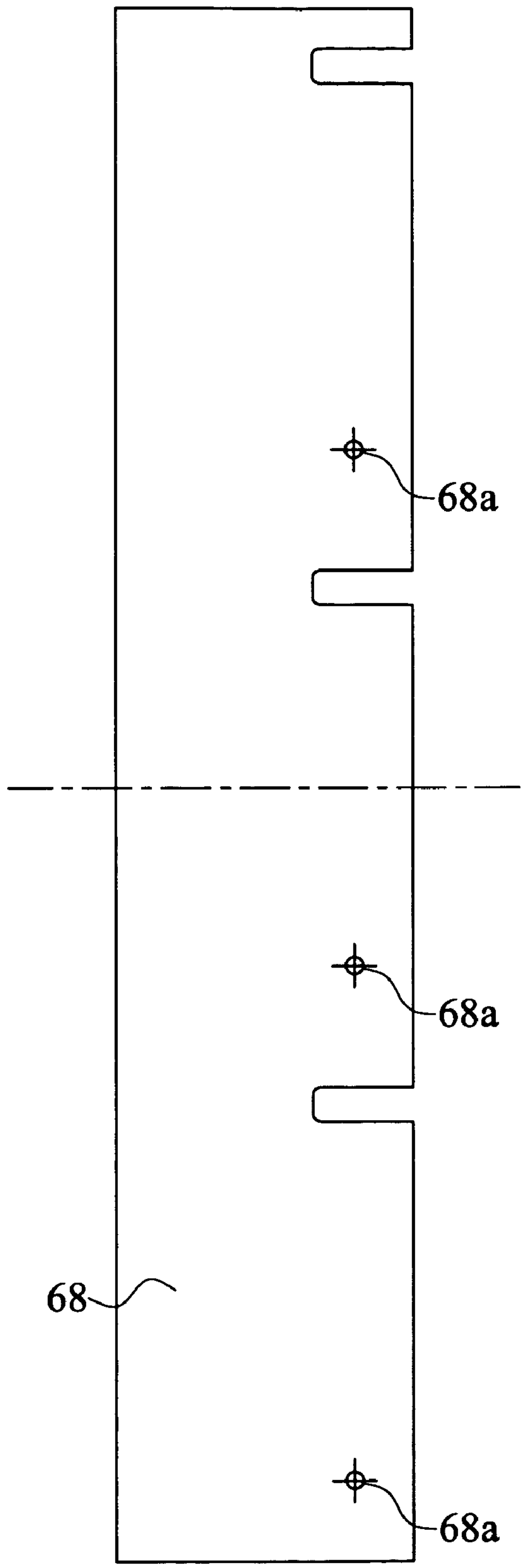
FIG. 11 is a schematic view of a first lens frame from the outer periphery thereof.

FIG. 11 is a schematic view of a first lens frame 68 from the outer periphery thereof. The first lens frame 68 is located inside the cam barrel 65 to support the first lens group 31. Three follower pins 69 are inserted into holes 68*a* of the first lens frame 68. A follower portion 69*a*, formed at the outer periphery of the follower pin 69, engages with the cam groove 65*d* disposed at the inner periphery of the cam barrel 65. A guide portion 69*d*, disposed at the inner periphery of the follower pin 69, engages with a guide hole 67*d* of the forward barrel 67 along the optical axis direction. Thus, the first lens frame 68 is driven forward/backward along the cam groove 65*d* of the cam barrel 65 in the optical axis direction by means of the rotation of the forward barrel 67 with respect to the cam barrel 65, and the rotation of the cam barrel 65 with respect to the restraining barrel 63. That is, the first lens frame 68 is not moved by the rotation of the forward barrel 67 with respect to the restraining barrel 63.

Figure 12:
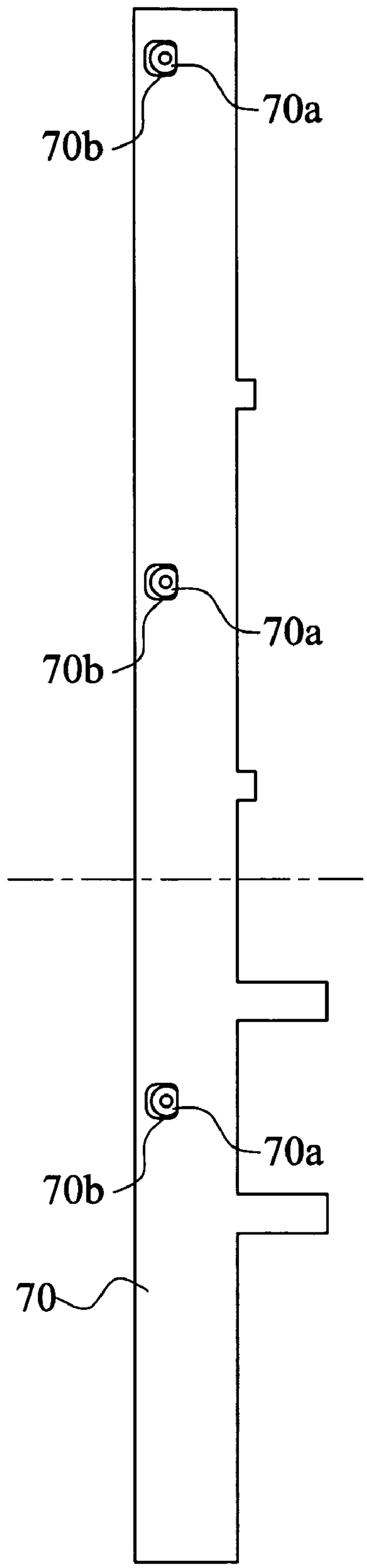
FIG. 12 is a schematic view of a second lens frame from the outer periphery thereof.

FIG. 12 is a schematic view of a second lens frame 70 from the outer periphery thereof. The second lens frame 70 is located inside the forward barrel 67 to support the second lens group 32. Three cam followers 70*a* are formed at the outer periphery of the second lens frame 70, and engage with the cam grooves 65*e* disposed at the inner periphery of the cam barrel 65. Bases 70*b* of the cam followers 70*a* of the second lens frame 70 engage with the guide holes 67*e* of the forward barrel 67 along the optical axis direction. Thus, the second lens frame 70 is driven forward/backward along the cam groove 65*d* of the cam barrel 65 along the optical axis direction by means of the rotation of the forward barrel 67 with respect to the cam barrel 65, and the rotation of the cam barrel 65 with respect to the restraining barrel 63. That is, the second lens frame 70 is not moved by the rotation of the forward barrel 67 with respect to the restraining barrel 63.

A shutter unit 71 is mounted at the second lens frame 71, controlling entry of incident light from the side near the object. A flexible printed circuit board 72 connects an actuator 71*a* of the shutter unit 71 and the control circuit of the camera, and is connected to the flexible printed circuit board 51, disposed behind the CCD holder 21, through the lens barrel 2 from the shutter unit 71.

A bias spring 73 is disposed between the second lens frame 70 and the first lens frame 68 to bias the second lens frame 70 and the first lens frame 68 from the optical axis direction. Thus, mesh between the first lens frame 68 and the cam barrel 65, and mesh between the second lens frame 70 and the cam barrel 65 remain tact, stabilizing the optical characteristics.

The motion of the lens barrel 2 from the collapsed position to the photographing position is described as follows.

Figure 13:
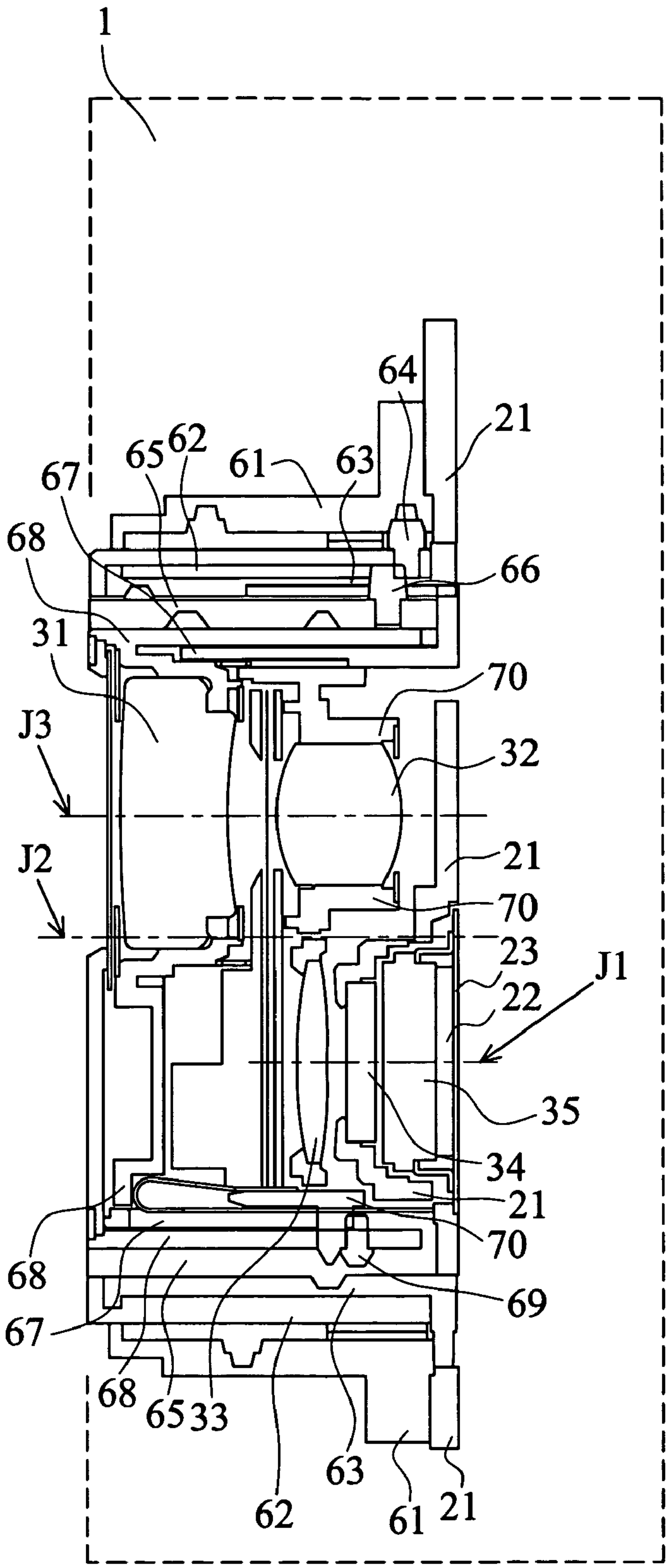
FIG. 13 is a cross section of the lens barrel in a collapsed position.
Figure 14:
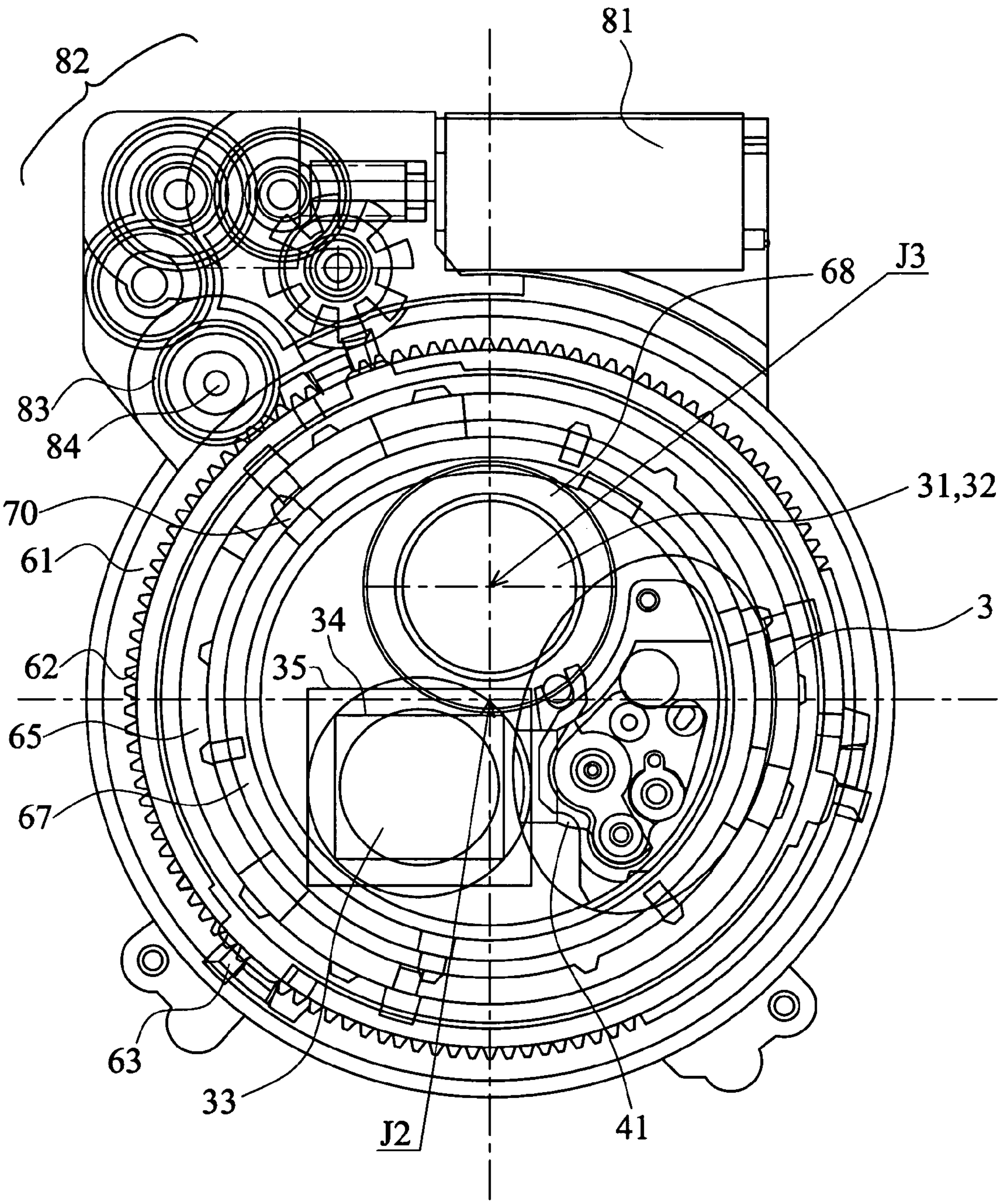
FIG. 14 is a front perspective view of the lens barrel in the collapsed position.
Figure 15:
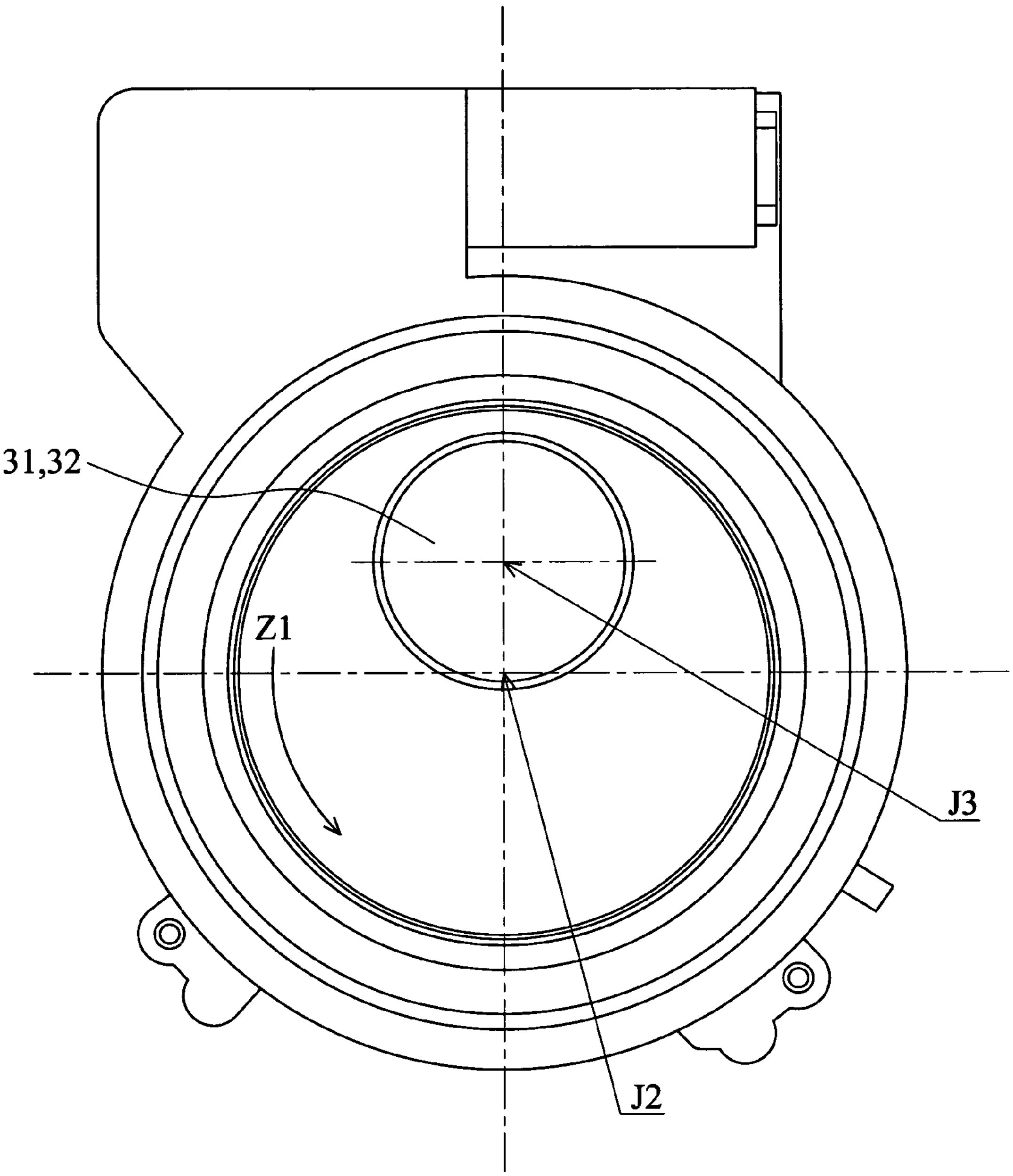
FIG. 15 is a front view of the lens barrel in the collapsed position.

FIG. 13 is a cross section of the lens barrel 2 in the collapsed position. FIG. 14 is a front perspective view of the lens barrel 2 in the collapsed position. J3 represents a central axis of the first and second lens groups 31 and 32. The first and second lens groups 31 and 32 are located at the side of the third lens group 33, the low pass filter 34, the CCD 35, and the focus driving mechanism 3, and away from the optical axis J1. That is, the first and second lens groups 31 and 32, the third lens group 33, the low pass filter 34, the CCD 35, and the focus driving mechanism 3 are substantially received at the same plane perpendicular to the optical axis direction.

Figure 16:
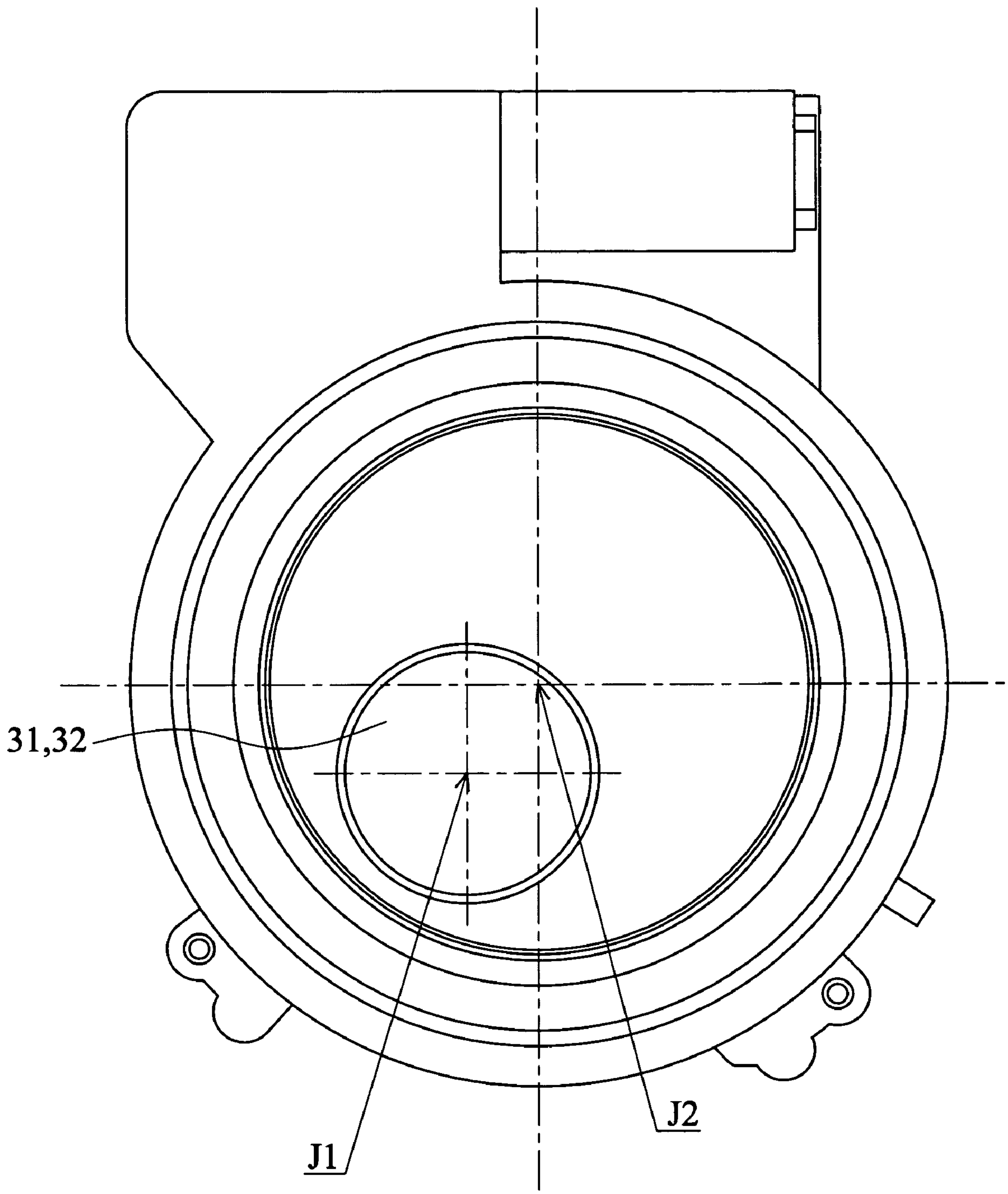
FIG. 16 is a front view of the lens barrel in the photographing position.

When the first and second lens groups 31 and 32 rotate around the central axis J2 of the lens barrel 2, they extend to the photographing position as shown in FIG. 1. As seen from the front side of the lens barrel 2, the first and second lens groups 31 and 32 in FIG. 15 rotates along a direction Z1, and moves to the photographing position as shown in FIG. 16. In the photographing position, since the central axis J3 of the first and second lens groups 31 and 32 is the same as the optical axis J1, an eccentric distance between the central axis J2 of the lens barrel 2 and the optical axis J1 equals to that between the central axis J2 of the lens barrel 2 and the central axis J3 of the first and second lens groups 31 and 32.

Figure 17:
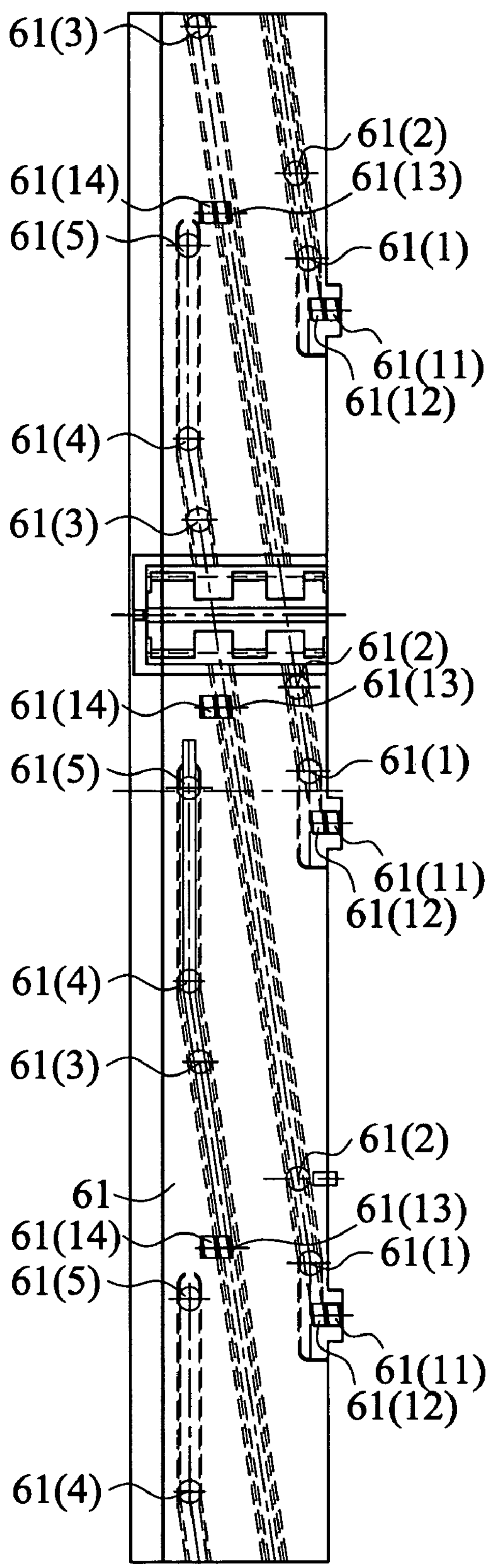
FIG. 17 is a schematic view showing positions of the cam groove of the fixed barrel.
Figure 18:
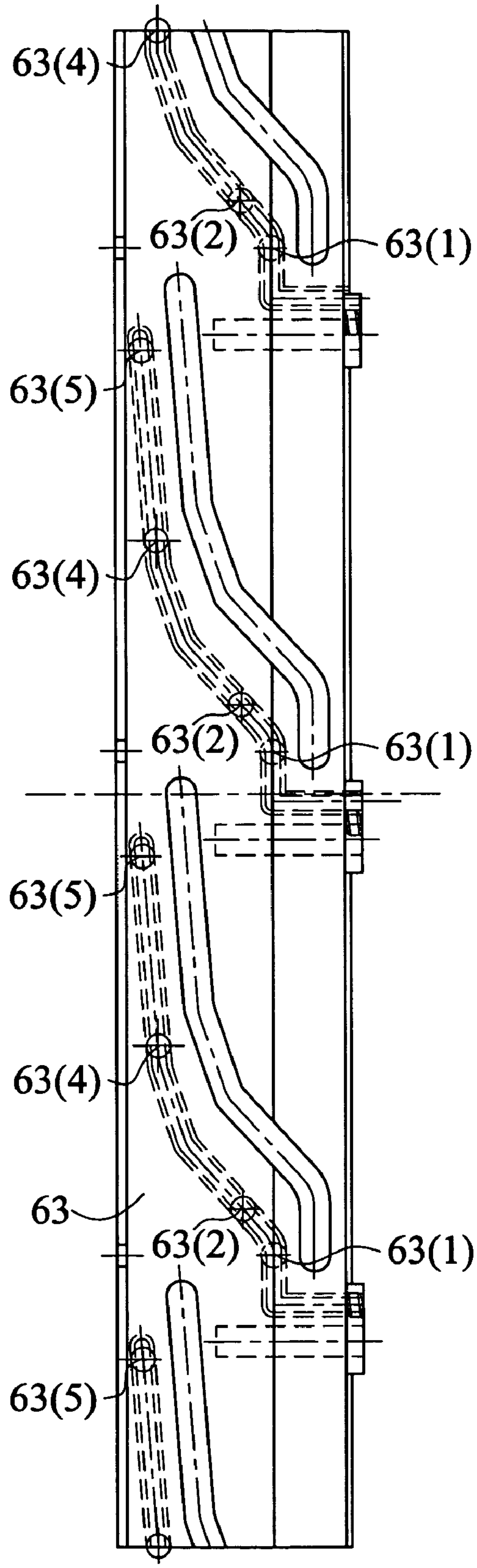
FIG. 18 is a schematic view showing positions of a cam groove of the restraining barrel.
Figure 19:
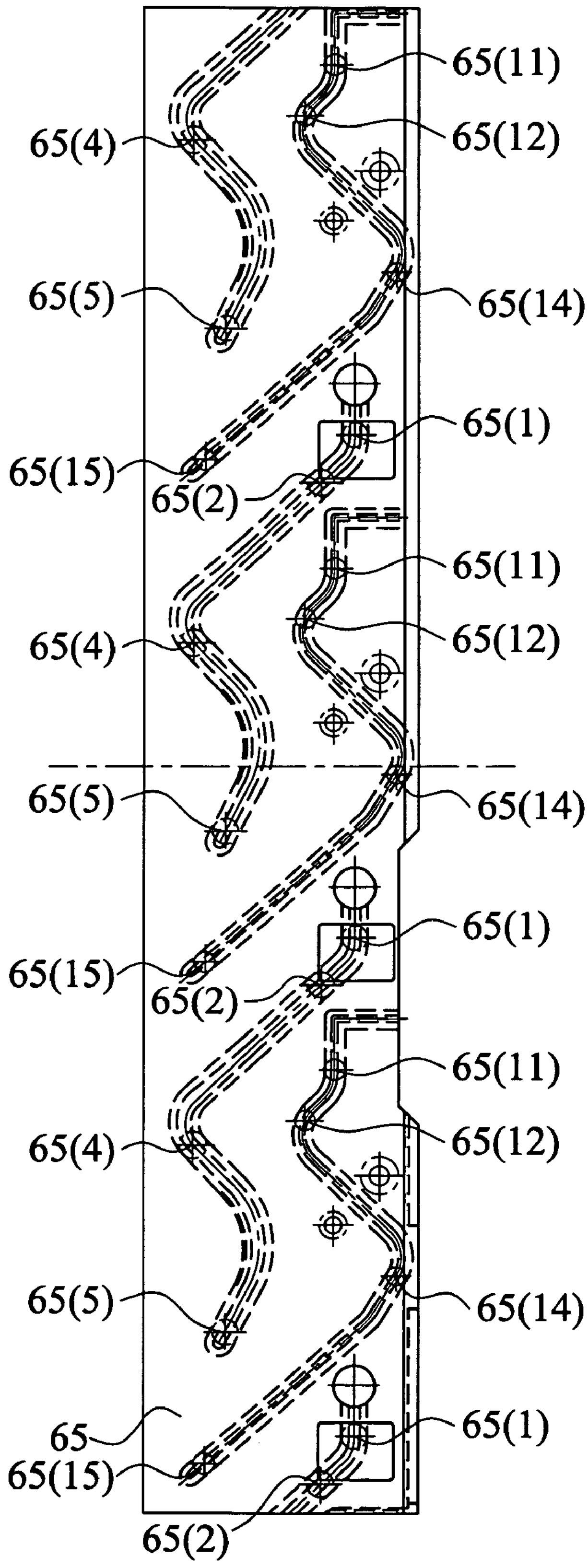
FIG. 19 is a schematic view showing positions of a cam groove of the cam barrel.

Referring to FIGS. 17–19, in the collapsed position of the lens barrel 2, the follower pins 64, inserted into the rotary barrel 62, are in the position 61(1) of the cam groove of the fixed barrel 61. The cam followers 63*b* of the restraining barrel 63 are in the position 61(11) of the cam groove of the fixed barrel 61. The cam followers 65*a* of the cam barrel 65 are in the position 63(1) of the cam groove of the restraining barrel 63. The follower pins 69, inserted into the first lens frame 68, are in the position 65(1) of the cam groove of the cam barrel 65. The cam followers 70*a* of the second lens frame 70 are in the position 65(11) of the cam grooves of the cam barrel 65.

When the rotary barrel 62 rotates around the central axis J2 by means of the rotation of the zoom gear 83, the follower pin 64 moves from the position 61(1) of the cam groove of the fixed barrel 61 to the position 61(2), and extends along the optical axis direction. The restraining barrel 63 limits the rotary barrel 62 to move toward the optical axis direction. Since the restraining barrel 63 is guided by the cam groove 61*b* of the fixed barrel 61, it extends from the position 61(11) of the cam groove of the fixed barrel 61 along the position 61(12) in the optical axis direction. When the restraining barrel 63 moves to the position 61(12) from the position 61(11), the cam follower 65*a* of the cam barrel 65 is moved to the position 63(2) from the position 63(1) of the cam groove of the restraining barrel 63 since the restraining barrel 63 is rotated with respect to the rotary barrel 62. At the same time, since the cam barrel 65 rotates with respect to the restraining barrel 63, the follower pin 69 moves to the position 65(2) from the position 65(1) of the cam groove of the cam barrel 65, and the cam follower 70*a* of the second lens frame 70 moves to the position 65(12) from the position 65(11) of the cam groove of the cam barrel 65.

When the follower pin 64 reaches the position 61(2) of the cam groove of the fixed barrel 61, the cam follower 63*b* of the restraining barrel 63 is moved to the position 61(12) of the cam groove of the fixed barrel 61, the cam follower 65*a* of the cam barrel 65 is moved to the position 63(2) of the cam groove of the restraining barrel 63, the follower pin 69 is moved to the position 65(2) of the cam groove of the cam barrel 65, and the cam follower 70*a* of the second lens frame 70 is moved to the position 65(12) of the cam groove of the cam barrel 65.

By means of the above operation, the restraining barrel 63 extends in the optical axis direction. Also, since the cam barrel 65, the first lens frame 68, and the second lens frame 70 extends along the optical axis direction, the first and second lens groups 31 and 32 extends on the side near the object in the optical axis direction.

Before the first and second lens groups 31 and 32 start to rotate, they can move to a position that may not interfere with the third lens group 33, the low pass filter 34, the CCD 35, and the focus driving mechanism 3.

When the follower pin 64 is rotated to the position 61(3) from the position 61(2) of the cam groove of the fixed barrel 61 to extend the rotary barrel 62, the cam follower 63*b* of the restraining barrel 63 reaches the position 61(13) of the cam groove of the fixed barrel 61. The restraining barrel 65 does not rotate with respect to the rotary barrel 62. The cam grooves 61*a* and 61*b* are formed on the fixed barrel 61 to equalize the average extending amount of the angle of the rotary barrel 62 and that of the restraining barrel 63.

Thus, the rotary barrel 62, the restraining barrel 63, the cam barrel 65, the forward barrel 67, the first lens frame 68, and the second lens frame 70 act integrally rotating together around the central axis J2 while extending.

When the follower pin 64 passes the position 61(13) of the cam groove of the fixed barrel 61, the rotary barrel 62 is smoothly extended since the cam groove 61*b* of the fixed barrel 61 is deeper than the cam groove 61*a*. Specifically, although the follower pin 64 does not engage at the side 61(14) of the cam groove 61*a* of the fixed barrel 61, the protrusion 62*b* of the rotary barrel 62 substantially engages with the cam groove 61*a* of the fixed barrel 61. That is, the follower pin 64 serves as a main guide portion of the cam groove 61*a* of the fixed barrel 61. The protrusion 62*b* is preferably formed on the rotary barrel 62 to guide the follower pin 64 through the position 61(13) of the cam groove of the fixed barrel 61. When the protrusion 62*b* of the rotary barrel 62 substantially engages the cam groove 61*a* of the fixed barrel 61, it does not overly limit the follower pin 64, affecting the guide function thereof.

When the follower pin 64 reaches the position 61(3) of the cam groove of the fixed barrel 61, and the cam follower 63*b* of the restraining barrel 63 reaches the position 61(13) of the cam groove of the fixed barrel 61, the optical axis J1 are identical with the central axis J3 of the first and second lens groups 31 and 32.

If the follower pin 64 is continuously rotated to the position 61(4) from the position 61(3) of the cam groove of the fixed barrel 61 to extend the rotary barrel 62, the cam follower 63*b* of the restraining barrel 63 moves to the position 61(14) from the position 61(13) of the cam groove of the fixed barrel 61 along the optical axis direction, similar to the follower pin 64 moving from the position 61(1) of the cam groove of the fixed barrel 61 to the position 61(2). That is, the restraining barrel 63 rotates with respect to the rotary barrel 62. The cam follower 65*a* of the cam barrel 65 moves to the position 63(4) from the position 63(2) of the cam groove of the cam barrel 63. The cam barrel 65 rotates with respect to the restraining barrel 63. The follower pin 69 moves to the position 65(4) from the position 65(2) of the cam groove of the cam barrel 65. The cam follower 70*a* of the second lens frame 70 is driven to the position 65(14) from the position 65(12) of the cam groove of the cam barrel 65, resulting in the photographing position of the lens barrel 2 in minimum zoom state, as shown in FIG. 1.

Zoom operation from the photographing position in minimum zoom state to that in full zoom state is described as follows.

Figure 20:
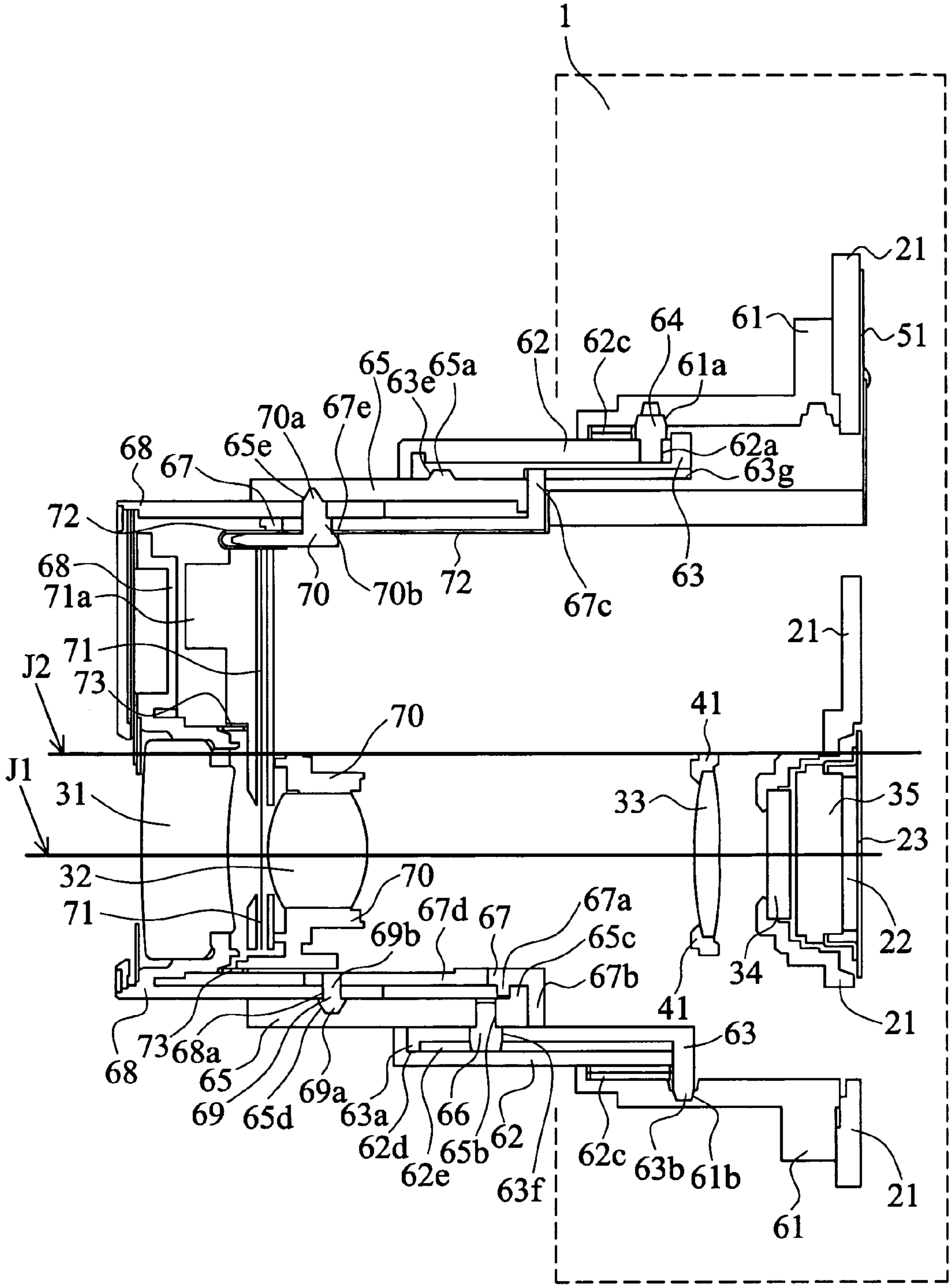
FIG. 20 is a cross section of the lens barrel in the photographing position in full zoom state.

The rotary barrel 62 is rotated by the zoom gear 83, and the follower pin 64 is moved from the position 61(4) of the cam groove of the fixed barrel 61 until it reaches the position 61(5) that represents the photographing position in full zoom state. The position 61(4) represents the photographing position in minimum zoom state. Since the cam groove of the fixed barrel 61 at this range is perpendicular to the optical axis direction, the rotary barrel 62 is not extended along the optical axis direction. Thus, the rotary barrel 62 rotates around the axis J2, and the restraining barrel 63 is stopped. During this motion, since the restraining barrel 63 rotates with respect to the rotary barrel 62, the cam follower 65*a* of the cam barrel 65 is moved from the position 63(4) of the cam groove of the restraining barrel 63 until it reaches the position 63(5). Also, since the cam barrel 65 rotates with respect to the restraining barrel 63, the follower pin 69 is moved from the position 65(4) of the cam groove of the cam barrel 65 until it reaches the position 65(5), and the cam follower 70*a* of the second lens frame 70 is moved from the position 65(14) of the cam groove of the cam barrel 65 until it reaches the position 65(15). Since the restraining barrel 63 is stopped, the first lens frame 68, supporting the first lens group 31, and the second lens frame 70, supporting the second lens group 32, do not rotate around the central axis J2, but move forward/backward along the optical axis direction. The cam grooves of the cam barrel 65 and the restraining barrel 63 consecutively adjust focal length between the minimum zoom state and the full zoom state. FIG. 20 is a cross section of the lens barrel 2 in the photographing position in full zoom state.

Transition from the photographing position in full zoom state to that in minimum zoom state may be driven by rotating the zoom gear 83 in a reverse direction. The focal length is adjusted by controlling the zoom motor 81 for driving the zoom gear 83. Additionally, transition from the photographing position in minimum zoom state to that in full zoom state may be driven by rotating the zoom gear 83 in a reverse direction to obtain the lens barrel 2 in the collapsed position as shown in FIG. 13.

Figure 21:
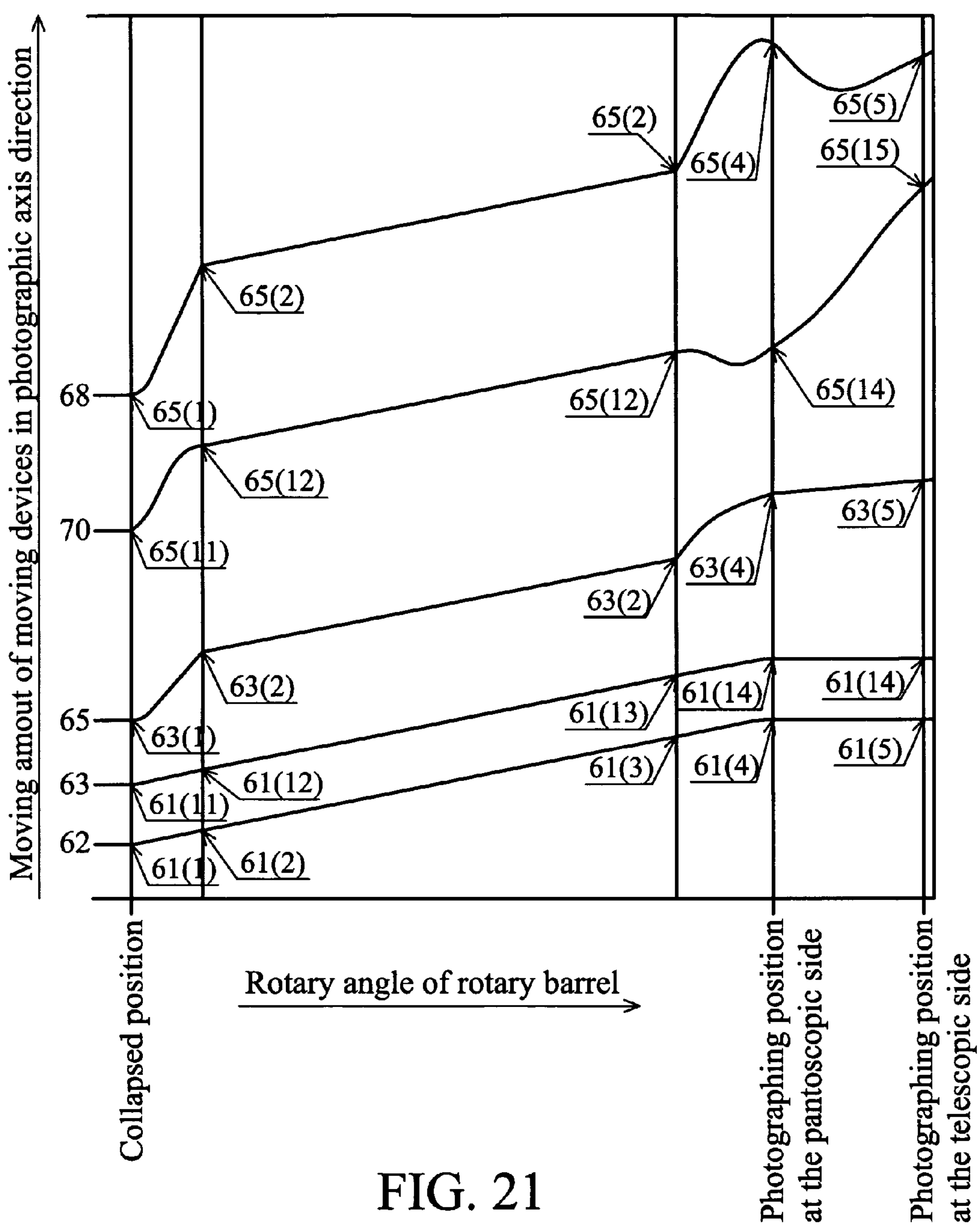
FIG. 21 is a graph showing the relationship between angles of the rotary barrel and distance traveled by moving devices along an optical axis.

FIG. 21 is a graph showing the relationship between angles of the rotary barrel 62 and distance traveled by moving devices of the lens barrel 2 along the optical axis. A transverse axis represents the rotary angle of the rotary barrel 62. A vertical axis represents absolute moving distance to the rotary barrel 62, the restraining barrel 63, the cam barrel 65, the second lens frame 70, and the first lens frame 68 in the optical axis direction. In FIG. 21, positions of the cam groove through which the moving devices pass in FIGS. 17–19 are shown. Distance traveled by the moving devices of the lens barrel 2 along the optical axis direction can be seen in FIG. 21.

As described, in the photographing position of the lens barrel 2, the first and second lens groups 31 and 32 may move along the optical axis J1 to zoom. In the collapsed position, the first and second lens groups 31 and 32 may be transferred to the side of the third lens group 33, the low pass filter 34, the CCD 35, and the focus driving mechanism 3. Thus, thinner lens barrel 2 can be obtained.

The screw shaft 48 drives the third lens group 33, acting as the focus lens group, and is disposed on the side of the focus motor 44. Thus, the thickness of the lens barrel 2 in the photographic direction is not affected by the focus driving mechanism 3. The length of the screw shaft 48 in the optical axis direction is fully maintained by the focus driving mechanism 3, such that the movement of the third lens group 33 along the optical axis direction is fully maintained, thus enhancing the freedom of the optical design.

The focus driving mechanism 3 is disposed inside the lens barrel 2. Since the devices can be efficiently arranged, the plane of the lens barrel 2 from the front side is minimized. Thus, the body 1 of the camera can be minimized.

Since the first and second lens groups 31 and 32 are supported together by a tubular device disposed inside the restraining barrel 63, the eccentricity and relative incline of the first and second lens groups 31 and 32 is reduced. Thus, the optical characteristic in the photographing position can be maintained.

Since the zoom motor 81 powers the driving mechanism, the rotation of the rotary barrel 62 is achieved without requiring additional mechanism for the first and second lens groups 31 and 32. Thus, the lens barrel can be simplified and minimized.

The lens barrel is described as above, it is not limited thereto, and may employ various variations.

For example, while an embodiment of the focus motor 44 is disposed in the photographic direction, it may be disposed in any direction with respect to the optical axis direction as long as the arrangement efficiency is good.

Additionally, while this embodiment is described based on the lens barrel with zoom function, it is not limited thereto, and may be a lens barrel without zoom function, such as a lens barrel with single focus. Even if the lens barrel with single focus is applied, it may still be received in the same position as that of the lens barrel with zooming motion. Thus, thinner lens barrel can be obtained, and the plane thereof can be minimized.

While the number of an embodiment of the lens groups constituting the optical system of the lens barrel is three, it is not limited thereto, and may be one, two, four or more. While an embodiment of the first and second lens groups 32 are transferred, it is not limited thereto, and may be any of the lens groups in the optical system to be transferred.

Since the thinner lens barrel and minimized camera with good portability are provided, they can be widely applied in the digital cameras.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A lens barrel, which is retractable in an electronic equipment, comprising:

an image-generating device generating a signal of an image of an object to be photographed;

a photographic lens system comprising a front lens group and a rear lens group disposed between the image-generating device and the front lens group; and a focus motor driving the rear lens group along an optical axis of the lens barrel;

wherein the front lens group is transferred to the side of the image-generating device out of the optical axis during collapsing the lens barrel.

2. The lens barrel as claimed in claim 1, wherein the front lens group comprises a first subgroup and a second subgroup, and the rear lens group is a focus lens group.

3. The lens barrel as claimed in claim 2, further comprising a driving mechanism moving the focus lens group along the optical axis and engaging with the focus motor.

4. The lens barrel as claimed in claim 3, wherein the driving mechanism comprising a screw shaft.

5. The lens barrel as claimed in claim 2, wherein, during collapsing the lens barrel, the first and second subgroups are transferred to the side of the image-generating device out of the optical axis, and the focus lens group is moving along the optical axis.

6. A lens barrel, which is retractable in an electronic equipment having an image-generating device generating a signal of an image of an object to be photographed, comprising:

a photographic lens system comprising a plurality of lens groups, wherein at least one of the lens groups is transferred to the side of the image-generating device out of an optical axis of the lens barrel during collapsing the lens barrel; and a focus motor driving the lens group adjacent to the image-generating device.

7. The lens barrel as claimed in claim 6, wherein the photographic lens system comprises a first lens group, a second lens group, and a third lens group from object side to image side.

8. The lens barrel as claimed in claim 7, wherein, during collapsing the lens barrel, the first and second lens groups are transferred to the side of the image-generating device out of the optical axis, and the third lens group is moving along the optical axis.

9. The lens barrel as claimed in claim 6, further comprising a driving mechanism moving the lens group adjacent to the image-generating device along the optical axis and engaging with the focus motor.

10. The lens barrel as claimed in claim 9, wherein the driving mechanism comprising a screw shaft.

11. A lens barrel, which is retractable in an electronic equipment having an image-generating device generating a signal of an image of an object to be photographed, comprising:

a photographic lens system comprising a plurality of lens groups, wherein at least one of the lens groups is transferred to the side of the image-generating device out of an optical axis of the lens barrel during collapsing the lens barrel; and a focus motor disposed inside the lens barrel to drive the lens group adjacent to the image-generating device along the optical axis.

12. The lens barrel as claimed in claim 11, wherein the photographic lens system comprises a first lens group, a second lens group, and a third lens group from object side to image side.

13. The lens barrel as claimed in claim 11, further comprising a driving mechanism moving the lens group adjacent to the image-generating device along the optical axis and engaging with the focus motor.

14. The lens barrel as claimed in claim 13, wherein the driving mechanism comprising a screw shaft.

15. The lens barrel as claimed in claim 12, wherein, during collapsing the lens barrel, the first and second lens groups are transferred to the side of the image-generating device out of the optical axis, and the third lens group is moving along the optical axis.

16. The lens barrel as claimed in claim 15, wherein the third lens group is moved toward the image-generating device.

* * * * *